(12) United States Patent
Engelke et al.

(10) Patent No.: US 10,611,277 B2
(45) Date of Patent: Apr. 7, 2020

(54) ADJUSTABLE THIGH SUPPORT FOR A VEHICLE SEAT

(71) Applicant: Ford Global Technologies, LLC, Dearborn, MI (US)

(72) Inventors: Julius Maximilian Engelke, Aachen (DE); Jessica Rebecca Rausch, Moenchengladbach (DE); Niels Pasligh, Monchengladbach (CH); Markus Franzen, Stolberg (DE); Carsten Starke, Vaals (NE); Philipp Wolf, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/214,383

(22) Filed: Dec. 10, 2018

(65) Prior Publication Data

US 2019/0202328 A1     Jul. 4, 2019

(30) Foreign Application Priority Data

Jan. 2, 2018    (DE) ........................ 10 2018 200 024

(51) Int. Cl.
*B60N 2/62*    (2006.01)
*A47C 7/14*    (2006.01)

(52) U.S. Cl.
CPC . *B60N 2/62* (2013.01); *A47C 7/14* (2013.01)

(58) Field of Classification Search
CPC ........................................................ B60N 2/62
USPC ................................................... 297/284.11
See application file for complete search history.

(56) References Cited

U.S. PATENT DOCUMENTS

| | | | |
|---|---|---|---|
| 5,388,888 A * | 2/1995 | Franzmann | B60N 2/1839 297/284.11 |
| 6,578,915 B2 | 6/2003 | Jonas et al. | |
| 6,746,077 B2 * | 6/2004 | Klukowski | B60N 2/42763 297/284.11 X |
| 6,908,149 B1 * | 6/2005 | Yamaguchi | B60N 2/4221 297/284.11 X |
| 7,156,457 B2 * | 1/2007 | Fujita | B60N 2/42763 297/284.11 X |
| 7,192,087 B2 | 3/2007 | Adragna et al. | |

(Continued)

FOREIGN PATENT DOCUMENTS

| | | |
|---|---|---|
| DE | 1554041 B1 | 1/1970 |
| DE | 2948585 A1 | 6/1980 |

(Continued)

*Primary Examiner* — Rodney B White
(74) *Attorney, Agent, or Firm* — David Coppiellie; Price Heneveld LLP

(57) ABSTRACT

A vehicle seat comprises a seat surface and a thigh support. The thigh support is adjustable and/or movable by use of a first adjustment device in or opposed to a first adjustment direction, which preferably runs substantially parallel to the seat surface, from an extended position into a retracted position. Furthermore, the thigh support is deflectable substantially vertically to the seat surface and/or to the underlying surface by use of a force which can be exerted by a vehicle occupant and is downwardly directed in the direction of a vehicle floor, wherein the thigh support has at least one second adjustment device for setting and/or defining a movement resistance with which the thigh support opposes the downwardly directed force.

17 Claims, 3 Drawing Sheets

(56) References Cited

U.S. PATENT DOCUMENTS

| | | | | |
|---|---|---|---|---|
| 7,404,602 | B2* | 7/2008 | Okada | B60N 2/0284 |
| | | | | 297/284.11 X |
| 7,416,256 | B2* | 8/2008 | Fujita | B60N 2/502 |
| | | | | 297/284.11 X |
| 7,597,398 | B2 | 10/2009 | Lindsay | |
| 7,614,693 | B2* | 11/2009 | Ito | B60N 2/0284 |
| | | | | 297/284.11 |
| 8,272,687 | B2* | 9/2012 | Gross | B60N 2/4221 |
| | | | | 297/284.11 X |
| 8,393,681 | B2* | 3/2013 | Gross | B60N 2/42763 |
| | | | | 297/284.11 |
| 8,408,646 | B2 | 4/2013 | Harper et al. | |
| 9,399,418 | B2 | 7/2016 | Line et al. | |
| 9,616,776 | B1* | 4/2017 | Kondrad | B60N 2/0284 |
| 2007/0108817 | A1* | 5/2007 | Lee | B60N 2/62 |
| | | | | 297/284.11 |
| 2008/0174164 | A1* | 7/2008 | Becker | B60N 2/62 |
| | | | | 297/452.55 |
| 2010/0060058 | A1* | 3/2010 | Becker | B60N 2/0284 |
| | | | | 297/284.11 |
| 2011/0163583 | A1* | 7/2011 | Zhong | B60N 2/0284 |
| | | | | 297/337 |
| 2011/0248538 | A1 | 10/2011 | Harper et al. | |
| 2014/0159451 | A1* | 6/2014 | Mollica | B60N 2/0284 |
| | | | | 297/284.11 |
| 2015/0108816 | A1* | 4/2015 | Dry | B60N 2/62 |
| | | | | 297/423.19 |
| 2015/0239380 | A1* | 8/2015 | Sugiyama | B60N 2/646 |
| | | | | 297/452.18 |
| 2015/0274050 | A1* | 10/2015 | Hosbach | B60N 2/62 |
| | | | | 297/423.26 |
| 2016/0137104 | A1* | 5/2016 | Bortolon | B60N 2/62 |
| | | | | 297/284.11 |
| 2016/0227932 | A1* | 8/2016 | Bortolon | B60N 2/62 |
| 2016/0339805 | A1* | 11/2016 | Kim | B60N 2/929 |
| 2016/0339820 | A1* | 11/2016 | Kajino | B60N 2/995 |
| 2017/0028875 | A1* | 2/2017 | Masuda | B60N 2/62 |
| 2017/0203674 | A1* | 7/2017 | Hosbach | B60N 2/933 |
| 2017/0267141 | A1* | 9/2017 | Line | B60N 2/62 |
| 2017/0291521 | A1* | 10/2017 | Line | B60N 2/70 |
| 2017/0291522 | A1* | 10/2017 | Line | B60N 2/62 |
| 2017/0291523 | A1* | 10/2017 | Line | B60N 2/0232 |
| 2018/0001793 | A1* | 1/2018 | Pleskot | B60N 2/62 |
| 2018/0099595 | A1* | 4/2018 | Kondrad | B60N 2/929 |
| 2019/0106028 | A1* | 4/2019 | Kitagawa | B60N 2/4214 |

FOREIGN PATENT DOCUMENTS

| | | | | |
|---|---|---|---|---|
| DE | 19522682 | A1 | 1/1997 | |
| DE | 60110410 | T2 | 2/2006 | |
| DE | 102014201088 | A1 | 7/2014 | |
| DE | 102014220874 | A1 | 4/2015 | |
| DE | 102015104002 | A1 * | 10/2015 | B60N 2/62 |
| DE | 102016100463 | A1 | 7/2016 | |
| DE | 102016104893 | A1 | 10/2016 | |
| DE | 102016104899 | A1 | 10/2016 | |
| JP | 067804 | B2 | 2/1994 | |

* cited by examiner

ADJUSTABLE THIGH SUPPORT FOR A VEHICLE SEAT

FIELD OF THE INVENTION

The present invention generally relates to a vehicle seat, and more particularly relates to a motor vehicle seat having an adjustable thigh support and to a thigh-supporting apparatus for a vehicle seat.

BACKGROUND OF THE INVENTION

Vehicle seats for motor vehicles, in particular the seats of the drivers or vehicle operators, can be provided with upholstered thigh supports. Thigh supports are generally understood as meaning a movable attachment in the front region to the seat surface on which the driver or vehicle occupant is sitting. Unlike the generally immovable seat surface, which is directly adjacent to the backrest, although the thigh support is provided with a resistance, it is nevertheless movable in its position with respect to the seat surface. For example, for a braking operation, the driver can therefore exert a downwardly directed force on the thigh supports with his/her thighs and can thus push the thigh support downward. The resistance which the thigh supports have in relation to the downward movement of the thighs may be balanced or set or determined in such a manner that the dead weight of the thighs or of the legs is provided with a comfortable support, but, on the other hand, during a conscious downward movement of the thighs, for example during a braking operation, the movement resistance of the thigh support does not cause any delay in the brake path.

It may be desirable to adapt the distance of the thigh support with respect to the seat surface and also the movement resistance in relation to conscious downward movements of the thighs, in particular during braking operations, to the anatomical circumstances of the driver.

The movement resistance in relation to a downwardly directed force, in particular a downward movement of the legs, is typically determined by the distance of the front wall of the thigh support from the seat surface and therefore from the available lever arm. A large distance between thigh support and seat surface generally signifies a large lever arm and therefore a small movement resistance of the thigh support, although people who set a far distance generally also require a large movement resistance in relation to downward movements so that the legs can comfortably rest on the thigh support during the journey. Conversely, a small distance between the front wall of the thigh support and seat surface generally signifies a small lever arm and therefore a large movement resistance of the thigh support, although people who set a small distance generally also only require a low movement resistance.

Seats having mechanisms which set the thigh supports by use of a forward and backward movement are known from the prior art. For example, U.S. Pat. No. 7,597,398 generally discloses the adaptation of a thigh support for different body heights. The thigh support here comprises a roller which is coupled to the seat frame and is adjustable relative to the seat frame between a retracted position and an extended position, wherein the seat cushion is at least partially wound around the roller while the roller is in the retracted position. By contrast, the seat cushion is at least partially unwound from the roller when the roller is in the extended position.

U.S. Pat. No. 7,192,087 generally discloses an adjustable thigh cushion system for vehicle seats. The system comprises an electric motor which provides a rotational movement for moving an upholstered slope forward and back.

U.S. Pat. No. 8,408,646 generally discloses a seat arrangement comprising a seat shell and a seat base, which seat arrangement is designed so as to additionally support the legs. In addition, the arrangement comprises a rod and a motor with a drive shaft which is connected to the rod in an operationally ready state and can rotate the rod, wherein the rotation of the drive shaft causes a displacement of the seat shell in a direction forward or rearward.

U.S. Pat. No. 9,399,418 likewise generally discloses a vehicle seat arrangement comprising a front seat surface with a supporting base which is adjustable between a raised and a lowered position by use of a motor. In addition, the arrangement has a second supporting base which is adjacent to the first supporting base and is activatable independently thereof. As a result, different supporting positions can be selected for the occupant's leg.

U.S. Pat. No. 6,578,915 generally describes the moving of the thigh support using a rod sliding mechanism for a chair. By use of the adjustable thigh support, the legs of the user can rest on a floor or can lie in a manner deposited in a relaxed sitting position on the thigh support. The thigh support interacts here with the backrest.

It would be desirable to provide for an improved adjustable or moveable thigh support for vehicle seats, in particular for motor vehicles.

SUMMARY OF THE INVENTION

According to one aspect of the present disclosure, a vehicle seat for a motor vehicle is provided. The vehicle seat for a motor vehicle includes a seat surface, and a thigh support being adjustable and/or movable by use of a first adjustment device in or opposed to a first adjustment direction, substantially parallel to the seat surface, from an extended position into a retracted position and being deflectable substantially vertical to the seat surface and/or to a vehicle floor by use of a force which can be exerted by a vehicle occupant and is directed downward in the direction of the vehicle floor, wherein the thigh support has a second adjustment device for setting and/or determining a movement resistance with which the thigh support opposes the downwardly directed force.

According to another aspect of the present disclosure, a vehicle seat is provided. The vehicle seat includes a seat surface, a thigh support, a first adjustment device for moving the thigh support in a first adjustment direction, substantially parallel to the seat surface between extended and retracted positions and being deflectable substantially vertical to the seat surface by use of a downward force exerted by a vehicle occupant, and a second adjustment device for setting a movement resistance with which the thigh support opposes the downward force.

According to a further aspect of the present disclosure, a retractable and/or extendable thigh-supporting apparatus for a vehicle seat is provided. The apparatus includes a thigh support, and an adjustment device for setting a movement resistance with which the thigh support opposes a force which is directed downward in the direction of a vehicle floor and can be exerted by a vehicle occupant.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the various figures identical parts are always provided with the same reference sign, and therefore they are generally also only described once.

Figure 1:
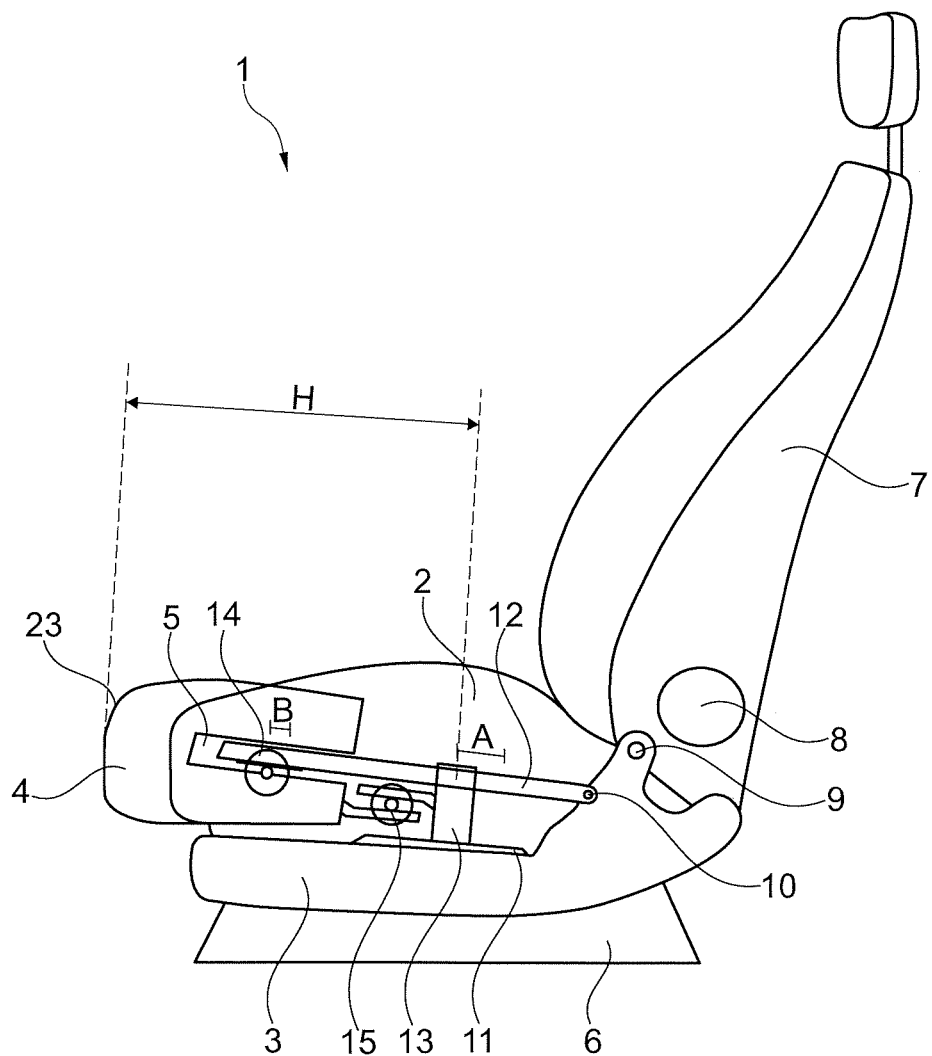
FIG. 1 is a side sectional view of an exemplary embodiment of a vehicle seat having a thigh-supporting apparatus.

FIG. 1 shows a vehicle seat 1 comprising a seat surface 2 and a seat base 3. The seat surface 2 and seat base 3 together surround or engage around an adjustment device for a thigh support 4. The thigh support 4 is connected to the vehicle seat 1 via a thigh-support-coupling apparatus 5. In addition, the vehicle seat 1 has a base 6 for mounting in the vehicle, and a seat back 7 which can be adapted to the anatomical features of a vehicle occupant and/or user about a seat-back rotary joint 9 by use of a seat-back adjustment device 8.

In the embodiment illustrated, the thigh support 4 is connected to the seat surface 2 and/or to the seat base 3 at at least two bearing points, shown as anchorings 10, 11 with corresponding fasteners. A guide device 12 permits the extension and the retraction of the thigh support 4 and also the adjustment of the rigidity of the thigh support 4, as a result of which the movement resistance thereof, which opposes a downwardly directed force, in particular a downward movement of the thighs of the seated vehicle occupant or user, is set or determined. In the sectional illustration shown, the guide device 12 is depicted as an individual guide rod 12. The guide rod 12 has a first anchoring 10 to the vehicle seat 1 at its end facing away from the thigh support 4. At its end facing the thigh support 4, the guide device 12 is movably/adjustably connected to the thigh-support-coupling apparatus 5. In the vertical direction, in particular in relation to the weight of the seated driver or vehicle occupant, the guide rod 12 is supported by use of a support 13 which, in turn, is connected to the vehicle seat 1 by a second anchoring 11.

A first adjustment device 14, with the aid of which the thigh support 4 can be extended or retracted by the adjustment distance B (shown by way of example) along the direction, which is predetermined by the guide rod 12 illustrated, is provided on the guide device 12. Furthermore, a second adjustment device 15 is provided, movably/adjustably connected to the support 13, with the aid of which the support 13 can be displaced by the adjustment distance A (shown by way of example) in a direction, which is predetermined by the guide rod 12 illustrated, for setting or determining the lever arm H. The lever arm H is shown by way of suggestion and extends from a front wall 23 of the thigh support 4 as far as the support 13.

Figure 2:
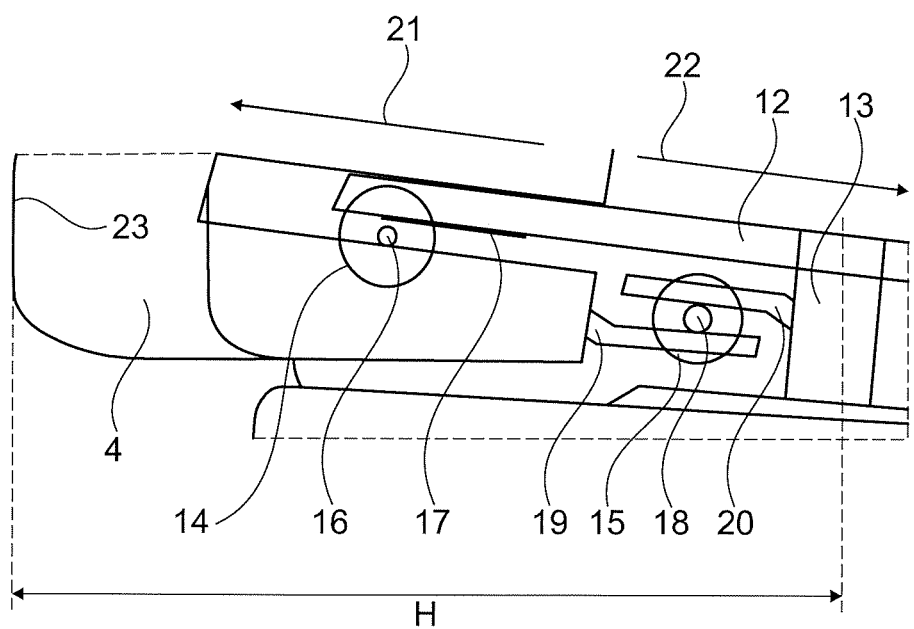
FIG. 2 is an enlarged detail view of an adjustment mechanism of the thigh-supporting apparatus from FIG. 1.

FIG. 2 shows an enlarged cutout of the illustration according to FIG. 1 and, in this connection, in particular the mechanism (illustrated in simplified form) of the adjustable thigh-supporting apparatus. The thigh support 4 is extendable or retractable along the guide device 12 by use of the first adjustment device 14, as a result of which the first adjustment direction 21 is defined. The displacement of the thigh support 4 is made possible by use of a gearwheel/rack arrangement. In the case of the first adjustment device 14, a first spur gearwheel 16, which is fixedly connected to the thigh support 4, is in meshing engagement with a first rack 17, which is fixedly connected to the guide rod 12. The length of the first rack 17 further determines the maximum adjustment distance B (see FIG. 1) for the thigh support 4.

The thigh support 4 is extended in the adjustment direction 21, in the arrow direction illustrated. The thigh support 4 is retracted counter to the illustrated arrow direction. In FIG. 2, the first spur gearwheel 16 is at the frontmost position of the first rack 17, such that the thigh support 4 is in the frontmost possible position.

In the case of the second adjustment device 15, the second spur gearwheel 18 is in meshing engagement with a support rack 19, which is movably/adjustably connected to the support 13, and with a second thigh-support rack 20, which is movably/adjustably connected to the thigh support 4. The length of the racks 19, 20 therefore determines the maximum adjustment distance A (see FIG. 3) for the support 13. In the second adjustment direction 22 in the arrow direction illustrated, the lever arm H is extended which reduces the movement resistance which opposes a downwardly directed force. The movement resistance is increased counter to the arrow direction illustrated since the lever arm H is shortened. In FIG. 2, the second spur gearwheel 18 is shown arranged in a central position. While the adjustment distance B remains constant, there is therefore also space to increase or to reduce the movement resistance. The adjustment device 14 could be blocked for this purpose by use of a corresponding blocking device (not illustrated).

Figure 3:
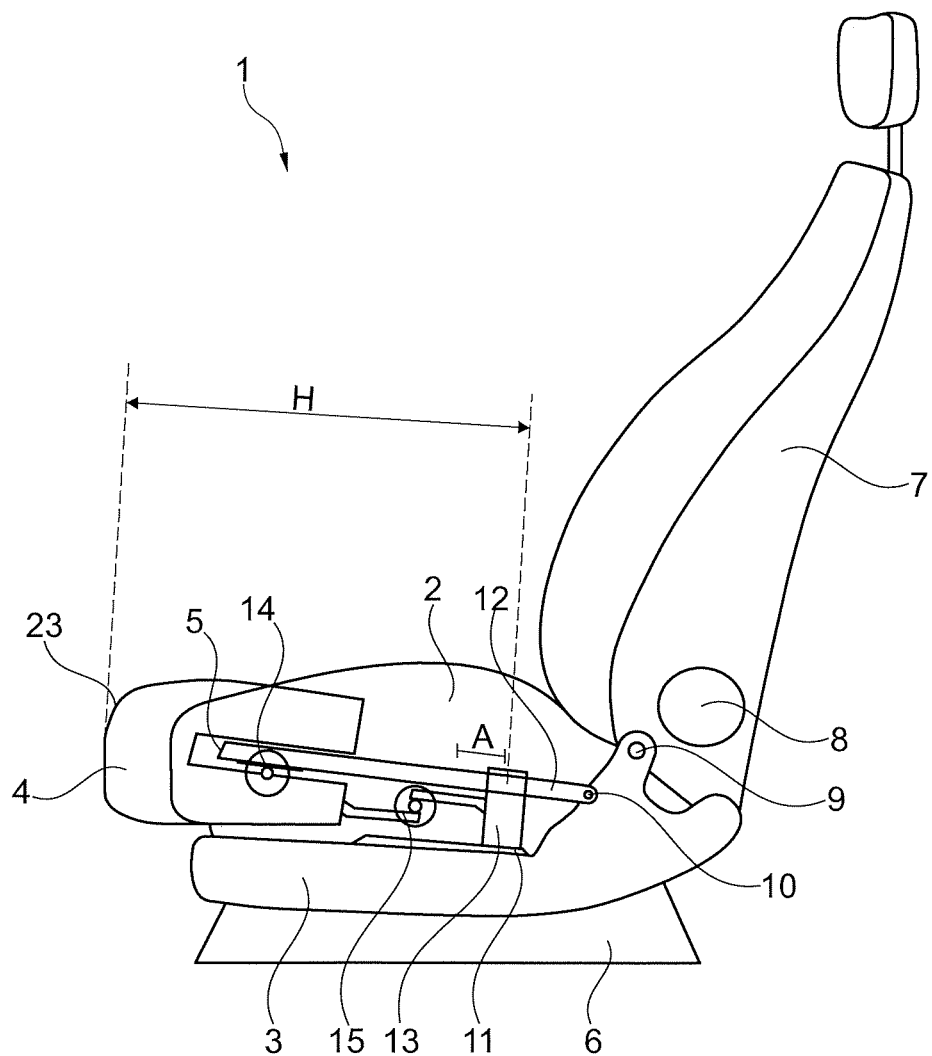
FIG. 3 is a side sectional view of a thigh-supporting apparatus having the lowest movement resistance which opposes a downwardly directed force, in a selected position of the thigh support.

FIG. 3 shows the same view as FIG. 1, but with the difference that the support 13 is arranged in the rearmost possible position of the guide rod 12 in the region of the seat back 7. As a result, irrespective of the position of the thigh support 4, the available lever arm H is maximized at a specified position of the thigh support 4, and therefore the movement resistance, which opposes a downwardly directed force, is minimized.

The disclosure provides a device for setting or determining the movement resistance of the thigh support, in particular independently of the position of the thigh support relative to the seat surface. According to the disclosure, this is achieved by a vehicle seat comprising a thigh support, in particular for motor vehicles and by a thigh-supporting apparatus.

It should be appreciated that the features and measures cited individually in the description can be combined with one another in any technically meaningful manner and present further configurations of the seat and thigh-supporting apparatus. The description characterizes and provides more details of the vehicle seat and thigh-supporting apparatus additionally in conjunction with the figures.

According to the disclosure, a vehicle seat, in particular for motor vehicles, has a seat surface and a thigh support, the thigh support being adjustable and/or movable by use of a first adjustment device in or opposed to a first adjustment direction, which preferably runs substantially parallel to the seat surface, from an extended position into a retracted position and is deflectable vertically to the seat surface and/or to the underlying ground by use of a force which can be exerted by a vehicle occupant and is directed downward in the direction of a vehicle floor and/or underlying surface. The thigh support has at least one second adjustment device for setting and/or determining the movement resistance with which the thigh support opposes the downwardly directed force. By using a device of this type, it is possible to adapt the movement resistance for downward movements of the thigh to the anatomical circumstances of the seated driver in addition to the position of the thigh support relative to the seat surface. An adjustable thigh support of a seat, in particular a vehicle seat, which is optimally adapted to the comfort requirements of the driver and to the safety requirements is therefore disclosed.

It should be emphasized that the movement in or opposed to the first adjustment direction can be basically provided both by use of linear movements and by use of rotational movements. For example, the first adjustment device runs substantially parallel to the seat surface or at an angle in the range of about 0 to 15° in relation to a plane oriented horizontally to the underlying surface and/or vehicle ground. If a new driver or different vehicle occupant sits on the seat surface of the seat, he/she customarily sets the seat parameters (backrest, headrest, horizontal position, . . . ) in an appropriate manner to his/her own body shape. If present, the thigh support also has to be correspondingly set. If, for example, a tall person with long thighs sits on a vehicle seat on which previously a small person with short thighs has sat, the thigh support has to be "extended." It is extended by the front wall of the thigh support increasing its distance from the seat surface. The increasing of the distance does not necessarily mean here that a gap occurs between thigh support and seat surface. On the contrary, by appropriate configuration of the seat shell and of the upholstery, the thigh support acts as a continuous lengthening and movable part of the seat surface. The extension or the retraction of the thigh support is therefore realized by a movement which runs substantially parallel to the seat surface.

An expedient development is realized in that the second adjustment device has at least one support, the position of which relative to the seat surface and/or to the thigh support sets or determines the resistance which opposes the downwardly directed force, for example exerted by the thighs of a seated vehicle occupant. A movement of the support relative to the seat surface in a longitudinal direction of the motor vehicle, for example, from the backrest toward the front wall of the thigh support, shortens the lever arm available for the movement resistance, i.e., increases the movement resistance. The movement of the support can be considered, for example, as a sliding displacement along a guide device. Conversely, a movement of the support along the guide device in an opposed direction, for example, from the front wall of the thigh support toward the backrest, reduces the movement resistance since the available lever arm is increased. If, therefore, the lever arm is designed at least partially as a bending spring, a displacement of the support would displace the support point at which the bending spring is mounted. For example, the guide device can run substantially parallel to the seat surface or at an angle in the range of about 0 to 15° in relation to a plane oriented horizontally to the underlying surface. As already described, an increase, for example, of the distance between the front wall of the thigh support and the seat surface by use of the increased lever would reduce the movement resistance for the downwardly directed force, for example the downward movement of the thighs. The second adjustment device can compensate for this generally undesirable effect with an additional movement, for example of the support, in a second adjustment direction. This additional movement can proceed simultaneously, i.e., isochronously. Alternatively, the movements can be carried out independently of one another in terms of time and both by use of linear movements and by use of rotational movements.

In an advantageous embodiment, the support may be designed for displacement in or opposed to a second adjustment direction which runs substantially parallel to the seat surface and therefore also substantially parallel to the first adjustment direction. This means that a movement which would undesirably increase the lever arm and therefore would reduce the movement resistance which opposes a downwardly directed force is compensated for by a second movement in the second adjustment direction. For example, a small person with short, but heavy thighs can set a short distance of the front wall of the thigh support from the seat surface and at the same time can set a high movement resistance by additional shortening of the lever arm, which brings about the movement resistance, by use of the second adjustment device.

In an optional embodiment, the seat has at least one common guide device which defines the adjustment directions along which the thigh support and the support can be displaced and can set and/or determine the movement resistance. This guide device can be designed, for example, as a guide rod, guide rail, guide groove or comparable device along which the support is mounted slideably. The lever arm which determines the movement resistance of the thigh support may be physically identical at least in partial regions to the guide device. For this purpose, the guide device can be simultaneously designed as a bending spring.

In an advantageous embodiment, the first adjustment device and the second adjustment device are operable and/or activatable in an interacting manner such that the position of the support relative to the thigh support does not change during adjusting of the position of the thigh support parallel to the seat surface from an extended position into a retracted position. Therefore, for example, an extension of the thigh support or thick supports does not signify a lengthening of the lever arm which is responsible for the movement resistance. In this case, ideally with a thigh support in the frontmost possible position, a maximum movement resistance is achieved by the fact that the support is also in the frontmost possible position. Conversely, with a thigh support in the rearmost possible position, the support is then also in the rearmost possible position in the region of the seat back, as a result of which it is made possible even for yet smaller people to press the upholstered thigh support downward, for example during emergency braking.

The first adjustment device and the second adjustment device are expediently operable and/or activatable independently of each other. The adjustment devices are individually activatable via preferably different operating devices. As a result, the distance of the front wall of the thigh support from the seat surface can firstly be increased, for example, while the available lever arm is additionally reduced and therefore the resulting movement resistance additionally increased. As a result, it is possible to attend to the individual requirements of the driver or vehicle operator or occupant. In the parked state, the driver's seat or other vehicle seat could thereby also be transferred into a comfortable rest position and/or reclining position by the movement resistance being set to its maximum value.

The first adjustment device and/or the second adjustment device preferably has a gearwheel/rack apparatus. For example, by rotation of a spur gear or spur gearwheel, thigh support and/or support and/or further components are displaced in or opposed to the designated adjustment directions. Corresponding racks which are in meshing engagement with the spur gears are fastened, for example, to a guide device, the thigh support and/or other components of the seat. For example, the adjustment devices can also be formed with other mechanical, electric, pneumatic or hydraulic operating mechanisms.

In a particular embodiment of the rack apparatus, the second adjustment device has a first rack, which is fixedly connected to the thigh support, and a second rack, which is fixedly connected to the support, and wherein the two racks are in meshing engagement with a spur gearwheel.

In an advantageous embodiment, the vehicle seat includes a device for electrical operability and/or activatability of the adjustment devices. The spur gearwheels already mentioned can be rotated, for example, via a handle and/or a hand crank on the side of the driver's seat. Alternatively, the activation can take place electrically by use of operating devices on the steering wheel, on the driver's seat or on the dashboard or at other suitable locations. Additionally or alternatively, the preferably preconfigured, adaption of the vehicle seat to the vehicle occupant can be carried out fully automatically by providing the vehicle seat with an appropriate sensor arrangement.

A thigh-supporting apparatus for the vehicle seat is also disclosed, in particular for motor vehicles, preferably with one of the preceding features and/or combinations of features, wherein the supporting apparatus has a thigh support with a device for setting and/or determining the movement resistance which opposes a downwardly directed force, for example of the thigh. The thigh-supporting apparatus is preferably installed in the vehicle seat of the driver or vehicle operator, but may also be installable in other seats, in particular in the other seats of a motor vehicle. If a thigh-supporting apparatus of this type is installed, for example on a rear bench of a motor vehicle, the setting parameters which are ideal for the respective vehicle passenger with regard to traveling safety and traveling comfort can be selected during the journey. By contrast, in the parked state, the distance, for example, of the front wall of the thigh supports from the seat surface could be minimized and at the same time the movement resistance of the thigh supports maximized. As a result, the rear bench could be repurposed into a comfortable resting surface.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat for a motor vehicle, comprising:
    a seat surface; and
    a thigh support being adjustable and/or movable by use of a first adjustment device in or opposed to a first adjustment direction, substantially parallel to the seat surface, from an extended position into a retracted position and being deflectable substantially vertical to the seat surface and/or to a vehicle floor by use of a force which can be exerted by a vehicle occupant and is directed downward in the direction of the vehicle floor, wherein the thigh support has a second adjustment device for setting and/or determining a movement resistance with which the thigh support opposes the downwardly directed force, and wherein the first adjustment device and the second adjustment device are operable and/or activatable in an interacting manner such that the position of the support relative to the thigh support does not change during the adjusting and/or moving of the position of the thigh support.

2. The vehicle seat as claimed in claim 1, wherein the second adjustment device has at least one support, the position of which relative to the seat surface and/or to the thigh support sets or determines the movement resistance which opposes the downwardly directed force.

3. The vehicle seat as claimed in claim 1, wherein the support is designed for displacement in or opposed to a second adjustment direction which runs substantially parallel to the seat surface.

4. The vehicle seat as claimed in claim 3 further comprising a common guide device which defines and/or determines the first adjustment direction and the second adjustment direction along which the thigh support and/or the support for setting and/or determining the movement resistance is displaceable.

5. The vehicle seat as claimed in claim 1, wherein the first adjustment device and the second adjustment device are operable and/or activatable independently of each other.

6. The vehicle seat as claimed in claim 1, wherein the first adjustment device and/or the second adjustment device are formed with at least one gearwheel/rack apparatus.

7. The vehicle seat as claimed in claim 6, wherein the second adjustment device has a thigh support rack, which is fixedly connected to the thigh support, and a support rack, which is fixedly connected to the support, and the thigh support rack and support rack are in meshing engagement with a spur gearwheel.

8. The vehicle seat as claimed in claim 1 further comprising at least one device for electrical operability and/or activatability of the first adjustment device and/or of the second adjustment device.

9. A vehicle seat, comprising:
    a seat surface;
    a thigh support;
    a first adjustment device for moving the thigh support in a first adjustment direction, substantially parallel to the seat surface between extended and retracted positions and being deflectable substantially vertical to the seat surface by use of a downward force exerted by a vehicle occupant;
    a second adjustment device for setting a movement resistance with which the thigh support opposes the downward force; and
    at least one device for electrical operability and/or activatability of the first adjustment device and/or of the second adjustment device.

10. The vehicle seat as claimed in claim 9, wherein the second adjustment device has at least one support, the position of which relative to the seat surface and/or to the thigh support sets or determines the movement resistance which opposes the downwardly directed force.

11. The vehicle seat as claimed in claim 9, wherein the support is designed for displacement in or opposed to a second adjustment direction which runs substantially parallel to the seat surface.

12. The vehicle seat as claimed in claim 11 further comprising a common guide device which defines and/or determines the first adjustment direction and the second adjustment direction along which the thigh support and/or the support for setting and/or determining the movement resistance is displaceable.

13. The vehicle seat as claimed in claim 9, wherein the first adjustment device and the second adjustment device are operable and/or activatable in an interacting manner such that the position of the support relatively to the thigh support does not change during the adjusting and/or moving of the position of the thigh support.

14. The vehicle seat as claimed in claim 9, wherein the first adjustment device and the second adjustment device are operable and/or activatable independently of each other.

15. The vehicle seat as claimed in claim 9, wherein the first adjustment device and/or the second adjustment device are formed with at least one gearwheel/rack apparatus.

16. The vehicle seat as claimed in claim 15, wherein the second adjustment device has a thigh support rack, which is fixedly connected to the thigh support, and a support rack, which is fixedly connected to the support, and the thigh support rack and support rack are in meshing engagement with a spur gearwheel.

17. A vehicle seat for a motor vehicle, comprising:
a seat surface; and
a thigh support being adjustable and/or movable by use of a first adjustment device in or opposed to a first adjustment direction, substantially parallel to the seat surface, from an extended position into a retracted position and being deflectable substantially vertical to the seat surface and/or to a vehicle floor by use of a force which can be exerted by a vehicle occupant and is directed downward in the direction of the vehicle floor, wherein the thigh support has a second adjustment device for setting and/or determining a movement resistance with which the thigh support opposes the downwardly directed force, wherein the first adjustment device and/or the second adjustment device are formed with at least one gearwheel/rack apparatus, and wherein the second adjustment device has a thigh support rack, which is fixedly connected to the thigh support, and a support rack, which is fixedly connected to the support, and the thigh support rack and support rack are in meshing engagement with a spur gearwheel.

* * * * *